Figure 1:
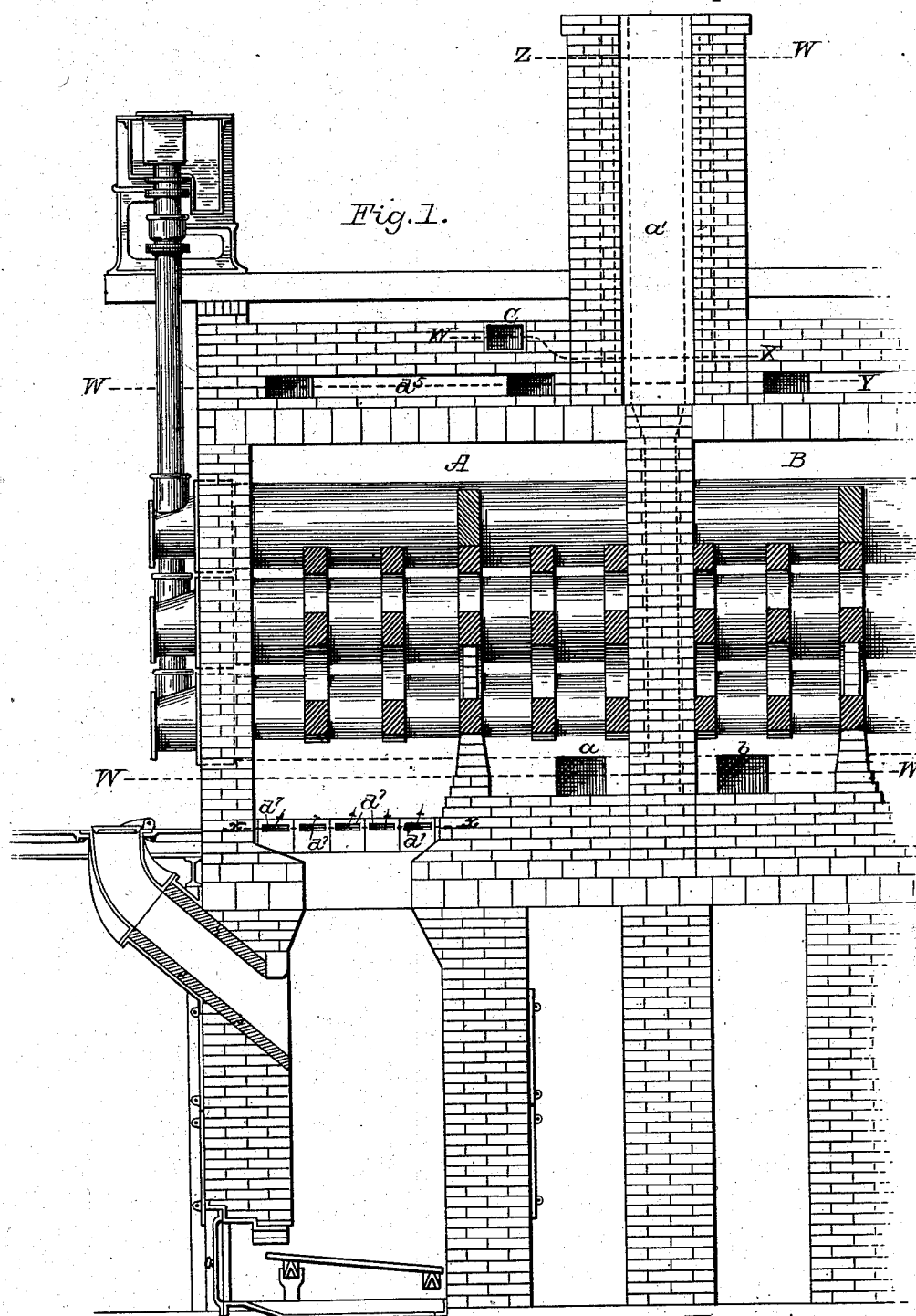

(No Model.)  4 Sheets—Sheet 1.

G. A. McILHENNY.
GAS RETORT FURNACE.

No. 284,458.  Patented Sept. 4, 1883.

Attest:
Philip F. Larner
Lowell Bartle

Inventor:
George A. McIlhenny
By ———— Attorney.

(No Model.) 4 Sheets—Sheet 2.
G. A. McILHENNY.
GAS RETORT FURNACE.
No. 284,458. Patented Sept. 4, 1883.
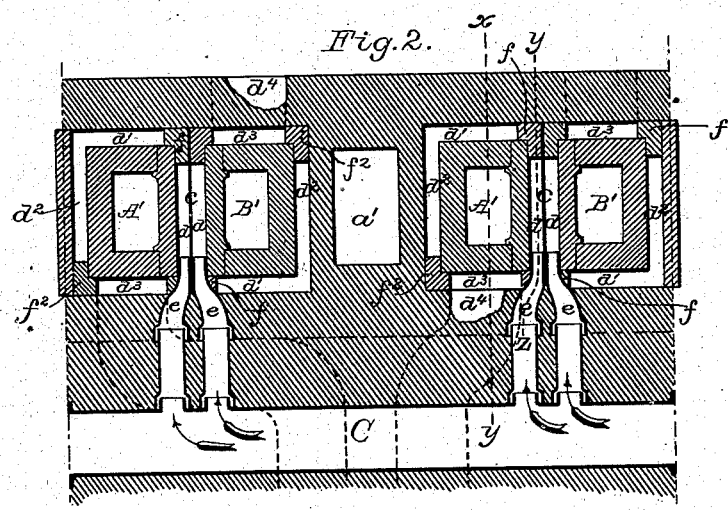
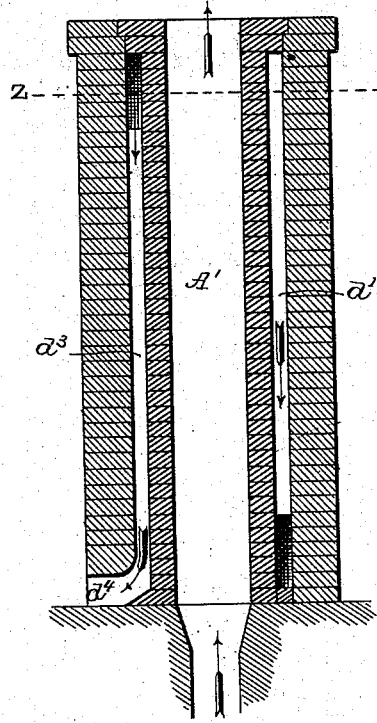
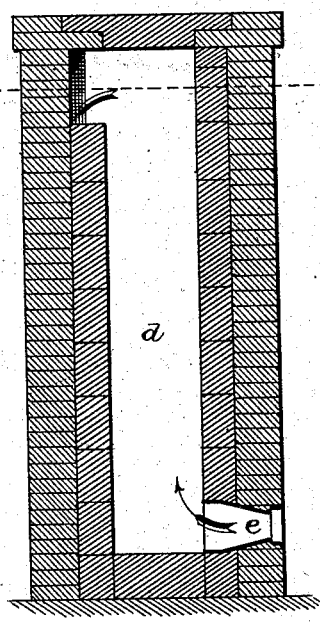
Attest:
Philip F. Larner
Howell Bartle
Inventor:
George A. McIlhenny
By [attorney signature]
Attorney.

(No Model.) 4 Sheets—Sheet 3.

G. A. McILHENNY.
GAS RETORT FURNACE.

No. 284,458. Patented Sept. 4, 1883.

Attest:
Philip F. Larner
Howell T. Bartle

Inventor:
George A. McIlhenny
By M. B. Wood
Attorney.

(No Model.) 4 Sheets—Sheet 4.
G. A. McILHENNY.
GAS RETORT FURNACE.
No. 284,458. Patented Sept. 4, 1883.
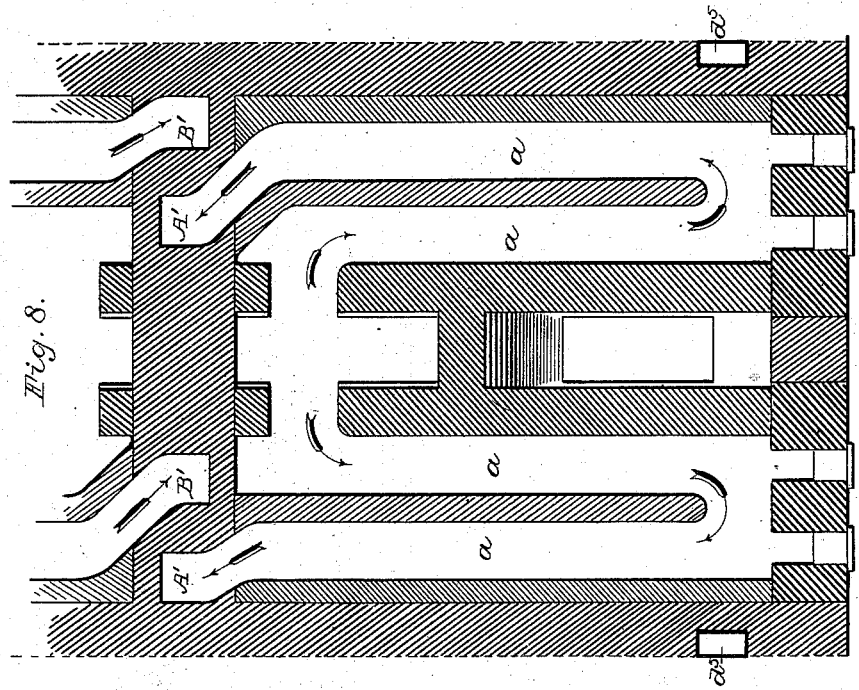
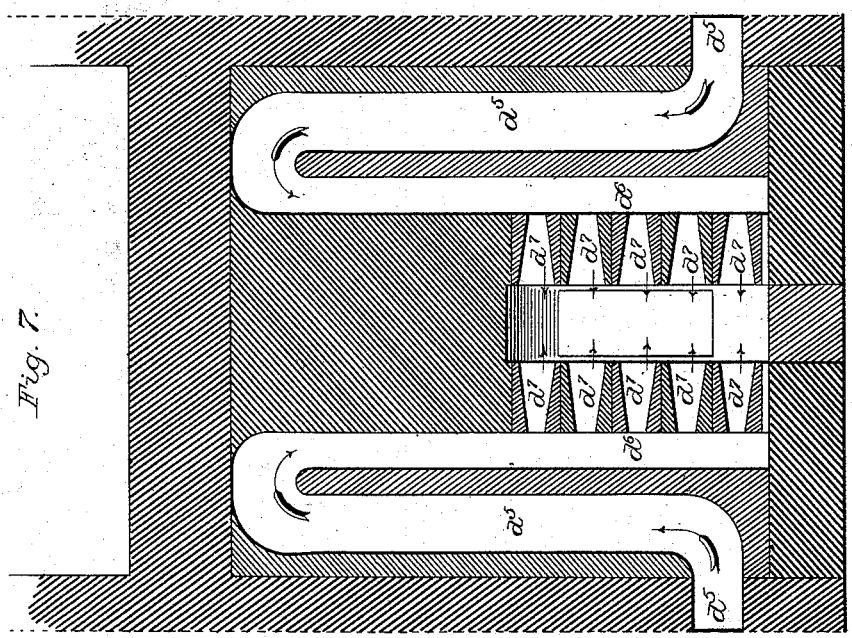
Attest:
Philip T. Larner
Nowell Bault
Inventor:
George A. McIlhenny
By McC. Ford
Attorney.
N. PETERS. Photo-Lithographer. Washington, D. C.

UNITED STATES PATENT OFFICE.

GEORGE A. McILHENNY, OF WASHINGTON, DISTRICT OF COLUMBIA.

GAS-RETORT FURNACE.

SPECIFICATION forming part of Letters Patent No. 284,458, dated September 4, 1883.

Application filed April 21, 1883. (No model.)

*To all whom it may concern:*

Be it known that I, GEORGE A. McILHENNY, of the city of Washington, in the District of Columbia, have invented certain new and useful Improvements in Gas-Retort Furnaces; and I do hereby declare that the following specification, taken in connection with the drawings furnished and forming a part of the same, is a clear, true, and complete description of my invention.

My said improvements relate to gas-retort furnaces operated under high temperatures, in accordance with what is termed the "recuperative system," which involves the continuous delivery to the combustion-chamber of the furnace of atmospheric oxygen charged with caloric from the contents of the uptake-flue of the furnace, and forced, after the manner of a hot-blast, into the combustion-chamber beneath the retorts. Apparatus of this general character is shown and described in my prior Letters Patent No. 248,335, dated October 18, A. D. 1881, wherein the exchange of caloric from the uptake to the forced air is effected within a horizontal tubular chamber overlying the retort-benches, and surrounded by a horizontal tubular flue, with which the vertical uptake-flues from the furnaces communicate at right angles.

As compared with any prior gas-making apparatus known to me for working under the system referred to, my present object is to economize in the production of gas from coal or other matter yielding gas in retorts by enabling each retort to properly operate on a heavier or larger charge, to extract the gas more thoroughly therefrom and in less time than heretofore, and also to obtain said enhanced results at a less expenditure of fuel; and I accomplish all of said ends by providing for the delivery of atmospheric oxygen to the combustion-chamber at a higher temperature than has, as I believe, been attainable with any prior gas-making apparatus.

In my aforesaid prior patented apparatus, as well as in others of similar construction, the atmospheric oxygen could only be heated during the vertical passage of the products of combustion from the furnaces for a distance equal to one-half the circumference of the tubular horizontal air-heating chamber, the columns of heat rising from the furnaces being divided and branched by said chamber, so as to pass upwardly on both sides thereof.

In certain other prior apparatus, between the top of the retort-furnace and the stack there have been horizontal uptake-flues arranged for a to-and-fro transit of the heated products of combustion, and within them horizontal air-heating flues have been located, and in some cases such air-heating flues have been extended downward directly through the retort-furnace, thus necessarily diverting more or less heat from the fire-bed which should be expended upon the retorts and their contents.

In accordance with my present invention, I employ only practically waste heat for heating the air, and I in no manner obstruct the uptake-flue of the furnace, as is the case when said uptakes are more or less occupied by horizontal air-heating chambers, as heretofore; and instead of having the air-heating chamber surrounded at different points by the heated products of combustion, as heretofore, I wholly surround a considerable portion of each uptake-flue with air-heating passages, so communicating alternately at top and bottom as to constitute, in effect, a highly efficient air-heating chamber of considerable length; and I so construct the uptake-flue that its sides or walls serve as heat-radiating surfaces, and therefore the entire lateral radiation of heat from the uptake-flue adjacent to the air-heating flue is utilized for producing a hot-blast of extraordinary high temperature, whereas in apparatus embodying the horizontal air-heating chambers surrounded by annular flues bisected by the uptake-flues only the inward radiation of the divided and fractional portion of the column of heat is rendered available for heating the air-blast. By thus independently providing each uptake-flue with its own air-heating chambers, the draft from any one furnace is in no manner impaired by the non-use or imperfect operation of the neighboring furnace at its back, whereas when the uptakes of two such furnaces communicate with one common horizontal flue containing the air-heating chamber, as heretofore, if either furnace be idle or undergoing repairs, the operation of the other is more or less adversely affected.

It is not broadly new to so arrange a retort-furnace and an air-heating flue that each furnace can heat its own air; but in prior apparatus embodying that feature the air-heating flue passes through the retort-furnace, thus employing more or less heat directly from the fire-bed, whereas in my apparatus the uptake-flues and their surrounding air-heating flues are located wholly within the division-wall and above the retort-furnaces, so that, as hereinbefore stated, the air is heated only by what would otherwise be wasted heat.

To more particularly describe my invention, I will refer to the accompanying drawings, in which—

Figure 5:
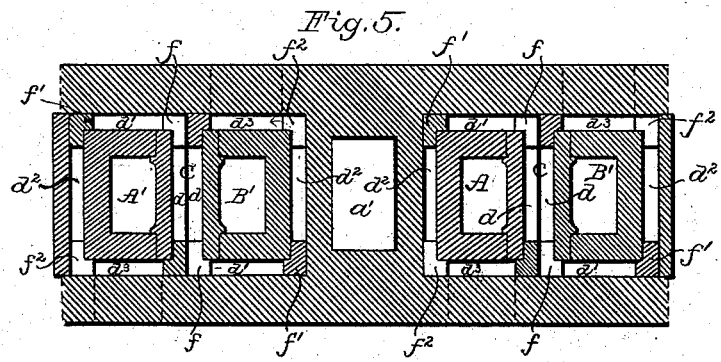
Figure 6:
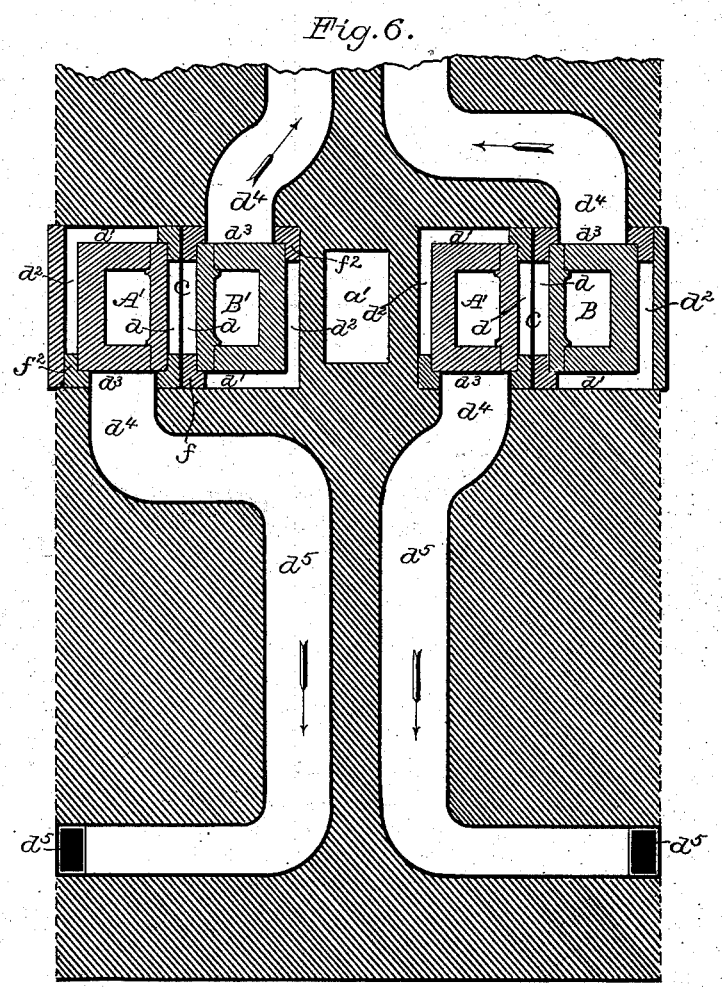

Figure 1 represents in longitudinal vertical section so much of a pair of retort benches and furnaces as is deemed necessary for illustration. Fig. 2 is a horizontal section of the uptake-flues and air-heating flues or chambers of both furnaces on line X W, Fig. 1, a little above the foot of said air-heating flues, but above the plane occupied by the tops of the furnaces. Fig. 3 is a transverse vertical section of Fig. 2 on line X Y. Fig. 4 is a transverse vertical section of Fig. 2 on line Y Z. Fig. 5 is a horizontal section through the upper portion of Figs. 3 and 4 on line Z W. Fig. 6 is a horizontal section of the uptake-flues and air-heating flues on line W Y, Fig. 1. Fig. 7 is a horizontal section on line X, Fig. 1. Fig. 8 is a horizontal section on line W, Fig. 1.

The retort-furnaces A and B, Fig. 1, are each adapted to operate benches of six retorts, and they are placed back to back, in the usual manner, thus locating the uptake-flues A' and B', Fig. 2, in the same line within and above the division-wall. Each furnace has two uptake-flues and the usual fire-pot and bridge-wall, so that the heated products of combustion rise from the fire-pot, pass over the bridge-wall to the rear portion of the furnace, are deflected and divided to the right hand and to the left below the two lowest retorts, at opposite sides of the furnace, and thence pass forward and then rearward within a horizontal return-flue, as shown at $a$ in Fig. 8, for furnace A, to the foot of an uptake-flue, A'. The return-flue $b$ for furnace B communicates in like manner with an uptake-flue, B'.

The arrangement of the furnaces and their uptake-flues may be largely varied without departure from the main features of my invention. The central vertical open space at $a'$, Figs. 1, 2, 5, and 6, incidentally occurs in building up the masonry for the furnaces and their uptakes, and it merely involves a saving in brick-work.

Each uptake-flue is composed of fire-brick of suitable form, and although said flues are shown to be rectangular in cross-section for getting extensive radiating-surface on their outer sides, they can be circular in form, if desired, without departure from my invention.

Each pair of uptake-flues A' and B' is upwardly surrounded to a desired height from near the tops of the furnaces by brick masonry sufficiently removed from all of the outer sides of said uptake-flues to afford required space for air-heating flues. Each pair of uptake-flues at their coincident sides are separated sufficiently to receive between them an iron diaphragm, $c$, and to afford on each side thereof an entering-air space, $d$, and each of these spaces, near its bottom, is provided with an induction-pipe, $e$, which communicates with an air-supply pipe, C, connected to a suitable blower or other suitable air-forcing machine. At the outside corners of the uptake-flues vertical columns of corner brick are interposed, thus dividing the space surrounding each uptake-flue into four separate air-spaces, which are sequentially connected alternately at top and bottom by passages respectively over and under the columns of corner brick, thus in substance rendering the said four air-spaces one continuous conduit or air-heating flue, leading upward on two sides of the uptake-flue and downward on the other two sides thereof. I obtain good results with air-spaces which are about seven feet high, and in sectional area are on one side of the uptake about three by eighteen inches and on the other about three by thirteen inches, and while I do not preclude myself from using a series of connected air-spaces of uniform sectional area I deem the variation substantially as shown and described to be of considerable value, because air passing from one space into another of greater or of lesser sectional area is more thoroughly mixed, and hence more effectually heated, than would be the case if said spaces were uniform in sectional area, all other conditions being equal.

Referring now to Figs. 2 and 5, it is to be understood that the air forced through either pipe $e$ enters and rises in the communicating air-space $d$, thence passes over the top of the corner column, $f$, to air-space $d'$, thence downward under the bottom of the next adjacent column, $f'$, to air-space $d^2$, thence upward and over the next corner column, $f^2$, to air-space $d^3$, and thence downward and outward laterally through port $d^4$ and flue $d^5$ on its way horizontally and downwardly to the distributing-flue $d^6$ on each side of the combustion-chamber of the furnace, into which the highly-heated air-blast is delivered through ports $d^7$, Figs. 1 and 7. The air-blast, as clearly indicated, enters wholly above the fire-pot and at a portion of the furnace which I have herein termed the "combustion-chamber."

It will be seen that the hot-air ports $d^4$ are alternately located on opposite sides for directly communicating with their respective furnaces, although all the air-heating flues are supplied with air from a blower by way of pipes $e$, which are all located on the same side of the line of flues and communicate with the air-supply pipe C. In practice I sometimes deem it desirable to provide each pipe $e$ with a valve or gate, by which either may be closed while the furnace to which it pertains is out of service. The air-heating flue described causes the blast of forced air to pass four times up and down in direct contact with the highly-heated walls of the uptake-flue, as described, and therefore the air-blast is frequently heated to a degree ranging from about 1200° to 1500° Fahrenheit, and as this exchange of caloric occurs only after the products of combustion have ascended above the top line of the furnaces, the heating of the air-blast is accomplished by means of what would otherwise be actually wasted heat. It will also be seen that the draft in the uptake-flues is in no manner obstructed, and that the flues of each furnace are wholly independent of the flues of other furnaces, and also that each furnace has air-heating flues or chambers peculiar to itself.

It is obvious that the square or rectangular uptake-flues, as shown and described, afford a desirable area of radiating-surface, and that the use of the corner columns or division-webs enables an economical division of the air-space into what is in substance a continuous air-heating flue or conduit for the air-blast; and it is equally obvious that the abrupt changes of direction vertically and laterally through the upper and lower passages contribute greatly to a turbulent condition of the air, highly favorable to good results in heating it; and it is to be understood that while I lay claim to this particular construction as a minor feature of my invention, I do not preclude myself, under certain other features of my present invention, from employing uptake-flues and air-heating flues otherwise constructed and arranged, so long as the air-heating flues are arranged to surround the uptake-flues and to traverse their exterior surfaces, for I am well aware, for instance, that an uptake-flue circular in cross-section may be employed with columns segmental in cross-section, and serving, like the corner columns described, to afford a continuous conduit.

It is also obvious that a continuous conduit may be obtained by encircling such a round or cylindrical uptake-flue with fire-brick laid in a spiral division-web, in lieu of the columns, to form a continuous spiral conduit or air-heating flue, one side of which throughout its length would be the outer surface of the uptake-flue. Such spiral web air-heating flues have heretofore been employed in furnaces expressly designed for heating air for blast purposes; but therein they were arranged to inclose a cylindrical uptake communicating directly at its base with one or more fire-beds; but I am the first to so organize an uptake of a gas-retort furnace with such inclosing and continuous air-heating flues that only practically waste heat is expended in heating the air.

With the single spiral air-flue described the air would be forced in at the top and delivered from the bottom; but if two of such spiral air-flues were employed around each uptake-flue they could obviously be connected at the top, and thus enable the air to be entered at the bottom of one spiral flue and delivered from the bottom of the other, thus causing the air to traverse up and down around the flue in a manner similar to its movements in the rectangular flues, although I deem this last-named form preferable, for reasons hereinbefore stated. While I deem the vertical arrangement of the uptake-flues and air-heating flues preferable to any other, it is obvious that substantially valuable results would accrue if said flues were arranged horizontally or inclined more or less.

Having thus described my invention, I claim as new and desire to secure by Letters Patent—

1. The combination, with a gas-retort furnace, of an uptake-flue surrounded by an air-heating space divided into several air-spaces alternately connected at top and bottom, substantially as described, whereby said spaces constitute a continuous conduit on all sides of the uptake-flue for heating air forced from a blower to the combustion-chamber of said furnace.

2. The combination, with a pair of gas-retort furnaces placed back to back, and independent uptake-flues in the division-wall between said furnaces, of independent air-heating flues inclosing or surrounding each uptake-flue above the furnaces, and communicating with their combustion-chambers, substantially as described, whereby the combustion-chamber of each furnace is supplied with a blast of air heated by radiation from all sides of one or more uptake-flues leading from said furnace, as set forth.

3. The combination, with a gas-retort furnace, of an uptake-flue which is rectangular in cross-section, inclosed within an air-space divided by corner columns into separate spaces communicating sequentially with each other by lateral passages, respectively, over and below said corner columns, substantially as described.

4. The combination, with a gas-retort furnace, of the uptake-flue and a series of air-heating spaces, varied in their sectional area, surrounding said flue, and connected to constitute a continuous air-heating flue, substantially as and for the purposes specified.

GEO. A. McILHENNY.

Witnesses:
JOHN C. POOR,
A. B. CLAXTON.